(12) United States Patent
van der Steur et al.

(10) Patent No.: US 9,970,481 B1
(45) Date of Patent: May 15, 2018

(54) ROTARY COATING ATOMIZER HAVING VIBRATION DAMPING AIR BEARINGS

(71) Applicants: Gunnar van der Steur, Chesapeake City, MD (US); Joseph Cichocki, Newark, DE (US)

(72) Inventors: Gunnar van der Steur, Chesapeake City, MD (US); Joseph Cichocki, Newark, DE (US)

(73) Assignee: EFC Systems, Inc., Havre de Grace, MD (US)

( * ) Notice: Subject to any disclaimer, the term of this patent is extended or adjusted under 35 U.S.C. 154(b) by 0 days. days.

(21) Appl. No.: 15/719,797

(22) Filed: Sep. 29, 2017

(51) Int. Cl.
*B05B 3/04* (2006.01)
*B05B 3/10* (2006.01)
*F16C 32/06* (2006.01)

(52) U.S. Cl.
CPC ........ *F16C 32/0614* (2013.01); *B05B 3/0418* (2013.01); *B05B 3/1035* (2013.01); *F16C 2208/10* (2013.01)

(58) Field of Classification Search
CPC ... B05B 3/0409; B05B 3/0418; B05B 3/1014; B05B 3/1035; B05B 5/0407; B05B 5/0415; F16C 32/0603; F16C 32/0607; F16C 32/0614; F16C 32/0618; F16C 32/0622; F16C 32/0625; F16C 32/0677; F16C 32/0681; F16C 32/0685; F16C 32/0688; F16C 32/0692; F16C 32/0696; F16C 2208/10
See application file for complete search history.

(56) References Cited

U.S. PATENT DOCUMENTS

| | | | |
|---|---|---|---|
| 3,969,822 A | 7/1976 | Fukuyama | |
| 4,368,853 A | 1/1983 | Morishita et al. | |
| 4,723,726 A | 2/1988 | Ooishi et al. | |
| 4,887,770 A | 12/1989 | Wacker et al. | |
| 4,899,936 A | 2/1990 | Weinstein | |
| 4,928,883 A | 5/1990 | Weinstein | |
| 4,936,507 A | 6/1990 | Weinstein | |
| 4,936,509 A | 6/1990 | Weinstein | |
| 4,936,510 A | 6/1990 | Weinstein | |
| 4,997,130 A | 3/1991 | Weinstein | |
| 5,073,037 A * | 12/1991 | Fujikawa | F16C 32/0696 384/107 |
| 5,660,480 A * | 8/1997 | Fujii | F16C 32/0696 384/107 |
| 5,698,269 A | 12/1997 | Carlblom et al. | |
| 5,788,164 A | 8/1998 | Tomita et al. | |
| 5,803,372 A | 9/1998 | Weinstein et al. | |

(Continued)

*Primary Examiner* — Darren W Gorman
(74) *Attorney, Agent, or Firm* — E. Alan Uebler, PA (57) ABSTRACT

Rotary bell cup atomizing apparatus driven by a turbine mounted on a rotatable motor shaft supported within an air bearing assembly is provided. The air bearing assembly includes a cylindrical main air bearing supporting the motor shaft, a proximal, annular, disk-shaped thrust bearing and a distal, annular, disk-shaped thrust bearing supporting the turbine, and including vibration-damping "O"-rings positioned adjacent the bearings. In operation, air supplied to the apparatus drives the turbine and supports the turbine and motor shaft such that all rotating surfaces of the atomizing apparatus are supported in air, and universal, 3-dimensional vibration damping, both axial and radial, of all rotating components is provided.

20 Claims, 7 Drawing Sheets

(56) References Cited

U.S. PATENT DOCUMENTS

| | | | |
|---|---|---|---|
| 5,830,274 A | 11/1998 | Jones et al. | |
| 6,019,515 A * | 2/2000 | Fujii | F16C 32/0696 384/107 |
| 6,328,475 B1 | 12/2001 | Jager | |
| 6,428,210 B1 | 8/2002 | Kafai | |
| 6,439,773 B1 * | 8/2002 | Fujikawa | F16C 32/0696 384/100 |
| 7,066,652 B2 * | 6/2006 | Fujikawa | F16C 32/0614 384/107 |
| 7,721,976 B2 | 5/2010 | Nolte et al. | |
| 8,162,544 B2 * | 4/2012 | Hirata | F16C 32/067 384/100 |
| 8,840,050 B2 | 9/2014 | Baumann et al. | |
| 8,973,848 B2 | 3/2015 | van der Steur | |
| 9,375,734 B1 * | 6/2016 | van der Steur | B05B 3/1092 |
| 9,624,981 B2 | 4/2017 | Ebi et al. | |
| 2001/0008257 A1 | 7/2001 | Scholz et al. | |
| 2002/0038827 A1 | 4/2002 | Fujii et al. | |
| 2003/0001032 A1 | 1/2003 | Reichler | |
| 2007/0257131 A1 * | 11/2007 | Brett | B05B 3/1035 239/223 |
| 2009/0285514 A1 | 11/2009 | Hori et al. | |

* cited by examiner

ROTARY COATING ATOMIZER HAVING VIBRATION DAMPING AIR BEARINGS

FIELD OF THE INVENTION

The present invention relates to air bearings used to support rotating, turbine-driven shafts. More specifically, the invention relates to air bearings supporting rotary bell cup atomizing apparatus useful in applying coatings to substrates.

BACKGROUND OF THE INVENTION

Air bearings are employed in a wide range of applications, for example, from gas turbine engines to precision machinery, to ink jet printers, and to high-speed dental drills. Air bearings have received widespread use in the robotically-controlled painting of vehicles by high-speed rotary bell cup atomizers. While the invention herein may be used in a wide variety of air bearing applications, for reasons of descriptive efficiency and expedience, the detailed principles underlying the operation of the invention and the apparatus employed will be presented with a focus on its use in rotary bell cup atomizers for applying paint to workpieces such as vehicles.

Known rotary atomizers can include a rotating bell cup applicator having a generally conical front flow surface extending between an inner, axially central paint supply orifice opening and a radially outer atomizing edge. Paint entering the bell cup through the central opening flows to the rear surface of a deflector and is disbursed radially outwardly towards the front diverging flow surface of the rotating bell cup, flowing thereover to the outer edge of the cup where it is atomized to a fine mist and applied to the workpiece.

Atomization is effected by centrifugal forces produced when the cup, mounted on a central motor shaft, is rotated at high speeds, typically at 60-80,000 RPM.

Rotary bell cup atomizers are used in liquid based paint coating operations and in powder coating operations. In such operations, electrostatic charging is applied to the atomized particles to enhance their attraction to the grounded substrate and produce a flawless finish, all of which is well known.

An early example of the use of an air bearing to support the central rotating motor shaft of an electrostatic spray painting device is found in U.S. Pat. No. 4,368,853 (1983, assigned to Toyota, K.K.). Therein, a rotary electrostatic spray painting device is disclosed comprising a rotary shaft and a spray head fixed onto the front end of the rotary shaft. Paint is fed onto the cup shaped inner wall of the spray head. The rotary shaft is supported by a single thrust air bearing and a pair of radial air bearings. The rotating motor shaft is supported by air injected through porous air bearings which enable the shaft to rotate at high rotational speeds, said to be up to 80,000 RPM, in a substantially frictionless environment. While porous air bearings are said to be useful, the reference cites no specific material of construction of any bearing.

Illustrating the diversity of applications in which air bearings find use, U.S. Pat. No. 3,969,822 discloses a porous, static pressure air bearing device for use in a dentist's handpiece. Therein, the porous, static pressure air bearing device includes a rotatable shaft for mounting thereon a cutting tool, a bearing case, an air bearing portion provided in the bearing case for supporting the rotatable shaft, and a turbine blade formed integrally with the shaft or mounted on the shaft. The air bearing portion is formed of porous material, and the reference cites sintered porous metal or ceramics, or porous synthetic resins, as suitable bearing materials. As disclosed in the '822 reference, sleeves of inverted L-shaped or L-shaped cross section are secured to the rotatable shaft such that the sleeves are in contact with the turbine blade and mounted on the outer diameter surface of the rotatable shaft. These sleeves may be formed integrally with the rotatable shaft or manufactured separately from the shaft for convenience of working. Air supplied through the air supply passage is injected against the turbine blade to rotate the rotatable shaft with the sleeves. The shaft is said to assume a high speed of rotation because it is supported by air bearings of low friction. Since the bearing portion is supported by O-rings, the damping effect provided thereby acts to absorb vibrations occurring in the rotatable shaft during its shift from an initial rotation to high-speed rotation.

U.S. Pat. No. 8,973,848 B2, commonly assigned, discloses a composite air bearing assembly supporting a turbine-driven rotatable motor shaft in a rotary bell cup atomizer. The assembly includes a composite cylindrical air bearing having alternating, bonded segmented porous carbon sections and nonporous carbon sections. The composite bearing has a sleeve installed circumferentially therearound. The sleeve has openings therein, therethrough and therearound such that the openings are adjacent the porous carbon sections and are oriented so as to be in longitudinal and circumferential registry with the porous carbon sections. Air passageways deliver supplied air into and through the sleeve openings, thence into and through the porous sections, thereby providing near-frictionless support for the rotating shaft. The assembly includes "O"-rings installed circumferentially therearound, one at each end of the assembly.

The disclosures of the '848 patent are incorporated here by reference.

A still further reference disclosing rotary bell cup atomizing apparatus and having relevance to certain features of the invention to be disclosed and claimed herein, is commonly-assigned U.S. Pat. No. 9,375,734 B1, the disclosures of which are also incorporated herein by reference.

From the cited prior art, it will be seen that air bearings constructed of various combinations of porous and nonporous materials (having orifices), sleeves, and "O"-rings are disclosed in the known atomizer prior art. However, the air bearing assembly disclosed and claimed herein, which provides its inherent and significant advantages over prior bearings, all to be described in detail hereinbelow, is nowhere disclosed in the known prior art.

SUMMARY OF THE INVENTION

Rotary bell cup atomizing apparatus driven by a turbine mounted on a rotatable motor shaft supported within an air bearing assembly is provided. The apparatus is contained within a housing and includes an external air supply for supplying air to drive the turbine and channeling air to the air bearing assembly. The air bearing assembly includes a cylindrical main air bearing supporting the motor shaft through which main bearing the motor shaft extends, a proximal, annular, disk-shaped thrust bearing supporting the turbine axially disposed proximally with respect to the turbine, through which thrust bearing the motor shaft extends, a distal, annular, disk-shaped thrust bearing supporting the turbine axially disposed distally with respect to the turbine, through which thrust bearing the motor shaft extends. The apparatus includes air gaps formed between all bearings and all in-operation rotating surfaces of the atomizing apparatus. The apparatus includes a vibration-damping "O"-ring positioned proximally adjacent the proximal thrust bearing through which the motor shaft extends, and a vibration-damping "O"-ring positioned distally adjacent the distal thrust bearing through which the motor shaft extends, and also includes "O"-rings installed circumferentially around the cylindrical main air bearing, one at the proximal end and one at the distal end of the main bearing. All bearings include air passageways extending through all bearings for supplying air from the external air supply through all bearings into all air gaps between all bearings and all in-operation rotating surfaces of the atomizing apparatus.

In operation, air supplied to the apparatus is delivered through the air passageways and into all air gaps, thereby driving the rotatable turbine and motor shaft such that all rotating surfaces of the atomizing apparatus are supported in air and the "O"-rings provide both axial and radial 3-dimensional vibration damping of the turbine and motor shaft during rotation.

In specific embodiments, the "O"-rings are composed of an elastomer, and a perfluoroelastomer is a preferred material. The main bearing may be constructed of nonporous carbon, porous carbon, or a composite of nonporous and porous carbon.

In a preferred embodiment, the main bearing is a composite bearing having alternating, segmented porous carbon sections and nonporous carbon sections bonded together. Thrust bearings of porous carbon and nonporous carbon are preferred. Composite thrust bearings may be constructed of suitable materials, including metals such as aluminum and carbon components, both nonporous carbon and porous carbon.

The apparatus may have at least one sleeve installed externally and circumferentially about the main bearing, the sleeve having openings formed therein, therethrough and therearound such that the openings are adjacent the porous carbon sections and are oriented so as to be in longitudinal and circumferential registry with the adjacent porous carbon sections. This apparatus may include "O"-rings installed externally and circumferentially about the at least one sleeve, one at the proximal end and one at the distal end thereof, all as more specifically described in U.S. Pat. No. 8,973,848 B2, which has been incorporated herein by reference.

The at least one sleeve may be constructed of a suitable metal such as stainless steel, a ferrous metal or a non-ferrous metal.

The atomizing apparatus may include a base plate and at least two inlet ports to the apparatus for supplying air to drive the turbine, wherein the at least two inlet ports are connected, respectively, to two air channels leading through the base plate, the two air channels converging within the base plate and opening into a single drive air outlet from the base plate, the single base plate drive air outlet mating at the base of the turbine assembly with a single drive air inlet into a flow distribution intermediate plate, which intermediate plate houses the blades of the turbine, wherein the intermediate plate has a channel therein and therearound extending from the single drive air inlet partially and substantially in a direction circumferentially around the intermediate plate, and through which intermediate plate channel the drive air is directed bi-directionally to the turbine blades, all as described in U.S. Pat. No. 9,375,734 B1, included here by reference.

In a still further embodiment, the apparatus includes a base plate and at least two drive air inlet ports connected, respectively, to two parallel drive air inlet channels leading into a flow distribution intermediate plate through which drive air is directed to the turbine blades.

In its broadest form, the invention provides an air bearing assembly supporting a turbine driven motor shaft, the assembly including a cylindrical main air bearing, preferably of carbon, supporting the motor shaft, a proximal, annular disk-shaped thrust bearing and a distal, annular disk-shaped thrust bearing, both preferably of carbon, and both supporting the turbine, and including vibration damping "O"-rings disposed adjacent all bearings to provide, universal 3-dimensional vibration damping of all rotating components.

DETAILED DESCRIPTION OF THE INVENTION AND PREFERRED EMBODIMENTS WITH REFERENCE TO THE DRAWINGS

Rotary bell cup atomizing apparatus driven by a turbine mounted on a rotatable motor shaft supported within an air bearing assembly is provided. The air bearing assembly includes a cylindrical main air bearing supporting the motor shaft, a proximal, annular, disk-shaped thrust bearing and a distal, annular, disk-shaped thrust bearing supporting the turbine, and including vibration-damping "O"-rings positioned adjacent the bearings. In operation, air supplied to the apparatus drives the turbine and supports the turbine and motor shaft such that all rotating surfaces of the atomizing apparatus are supported in air, and universal, 3-dimensional vibration damping, both axial and radial, of all rotating components is provided.

Figure 1:
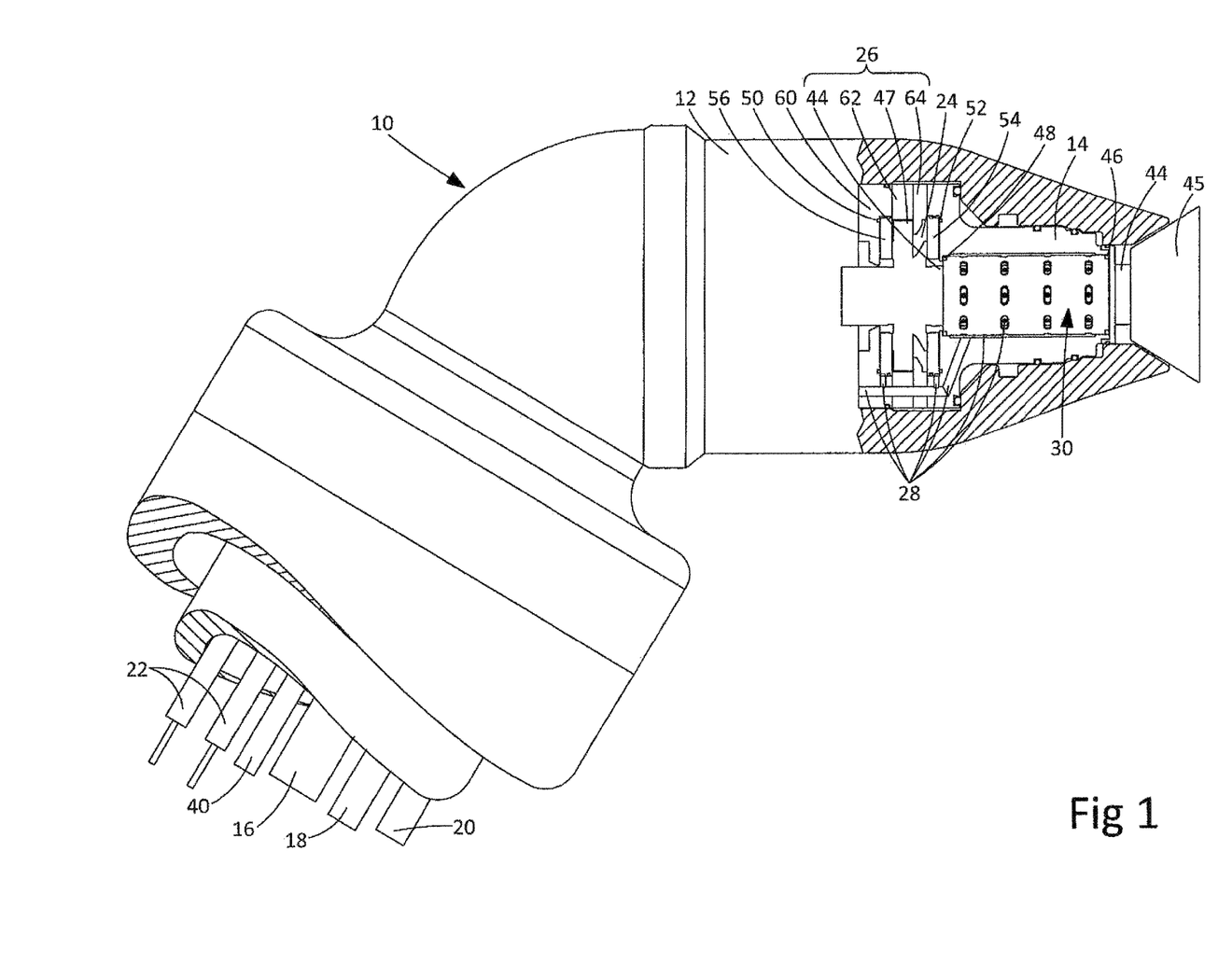
FIG. 1 is an elevational view, partially broken away and partially in cross-section, of the rotary bell cup atomizing apparatus of the invention.

A detailed description of the invention and preferred embodiments is best provided with reference to the accompanying drawings, wherein FIG. 1 is a side elevation, partially broken away and partially in cross-section, of the rotary bell cup atomizing apparatus 10 of the invention. In perspective, the elements of the apparatus include the external housing 12 of the atomizer which contains, as shown schematically, the air-driven turbine 47 mounted on motor shaft 44 on which is mounted the bell cup paint applicator 45 affixed to the distal end of the motor shaft 44. The motor shaft 44 is supported within the cylindrical main air bearing assembly 30 described below, through which assembly the motor shaft 44 extends, the shaft 44 and bearing assembly being contained within bearing housing 14. Turbine 47 mounted on shaft 44, and atomizer drive plate 62 and spacer plate 64, all described in detail below, are referred to as the turbine assembly, indicated by bracket 26. In FIG. 1, supply lines are shown schematically for supplying essential materials to the atomizer, including paint supply line 16, drive air supply line 40, bearing air supply line 18, supply line 20 supplying cleaning solvent, when required, and electrical conduits 22, all conventional.

Compressed drive air to drive turbine 47 is channeled through inlet port(s) 40 and internally to and through channel 24. Bearing air is supplied through line 18 into and through air passageways/channels 28 through bearing housing 14 to cylindrical main bearing assembly 30 and to proximal thrust bearing 56 and distal thrust bearing 54, the details of the air passageways and channels to be described below. Proximal thrust bearing axial vibration-damping "O"-ring 50 is positioned proximally adjacent proximal thrust bearing 56 and distal thrust bearing axial vibration-damping "O"-ring 52 is positioned distally adjacent distal thrust bearing 54, all as depicted in FIG. 1, and all to be described in detail below.

Figure 4:
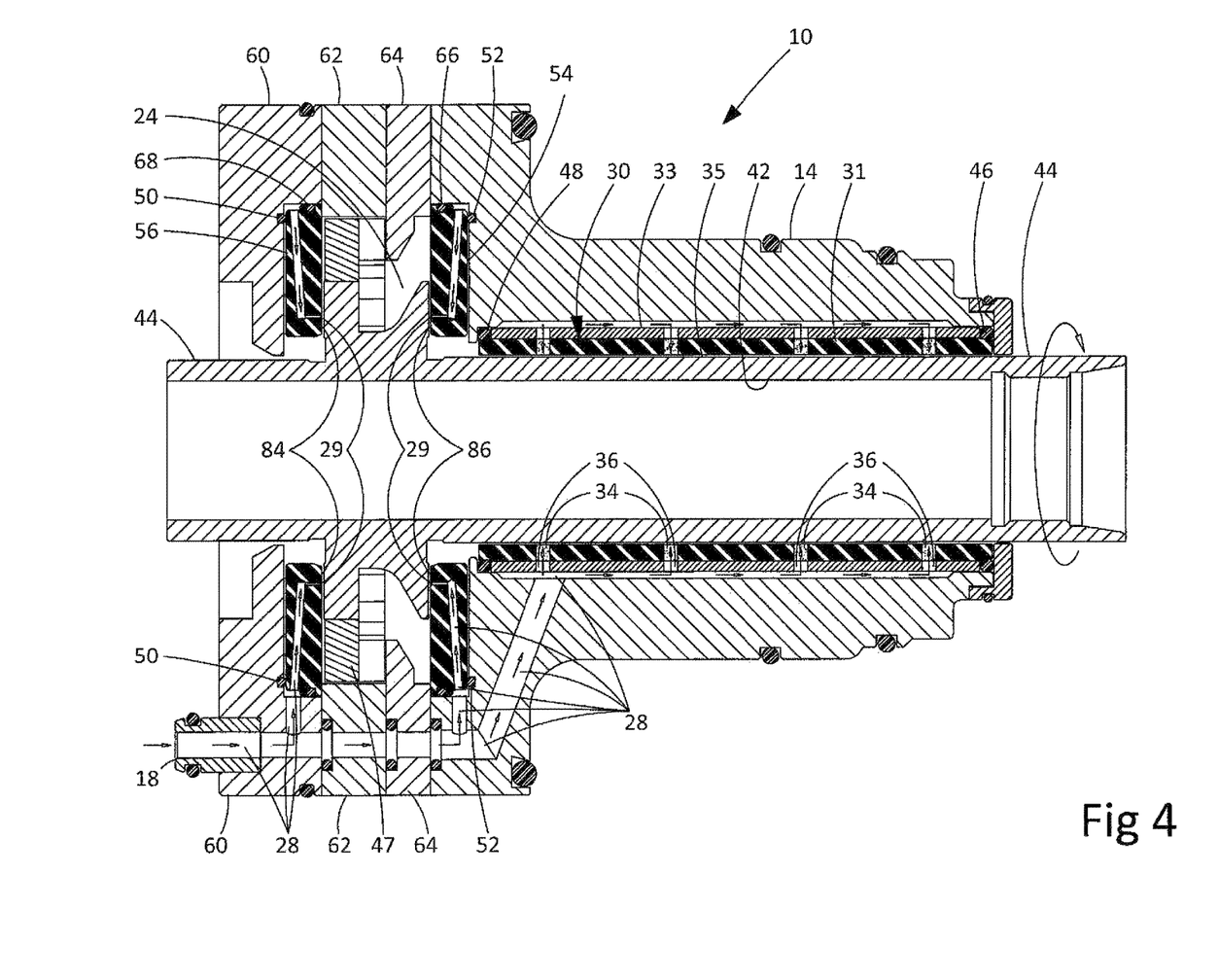
FIG. 4 is a side elevation in cross-section of a preferred embodiment of the rotary bell cup atomizing apparatus of the invention.
Figure 5:
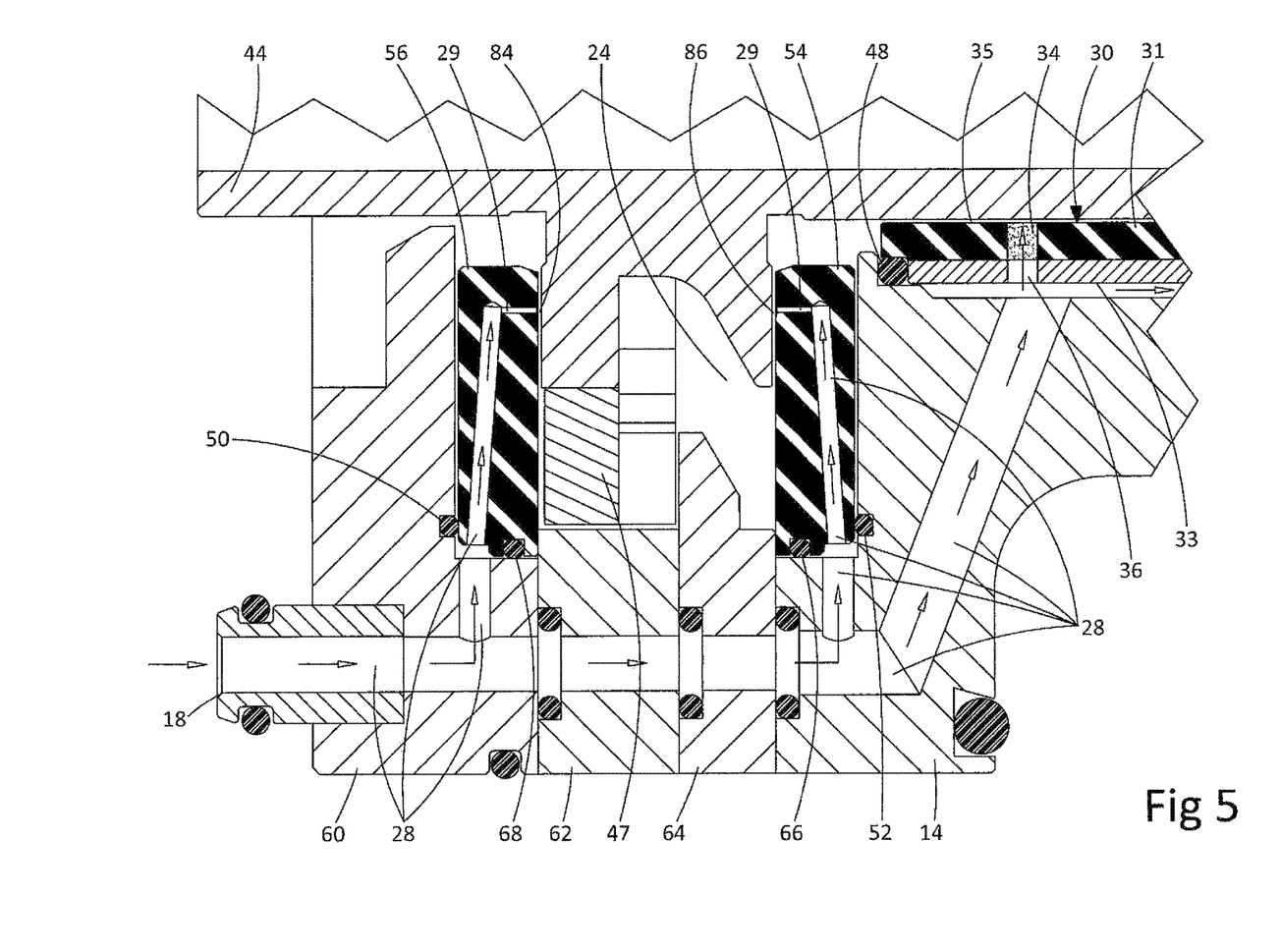
FIG. 5 is a cross-sectional exploded view of a portion of the bell cup atomizing apparatus and air bearing assembly according to the invention which is depicted in FIG. 4.

Also indicated in FIG. 1, and described and depicted in more detail below and shown in FIGS. 4 and 5, are radial vibration-damping "O"-rings 46 and 48, installed circumferentially around main bearing assembly 30, one proximate the proximal end and one proximate the distal end of the main bearing assembly 30.

Figure 2:
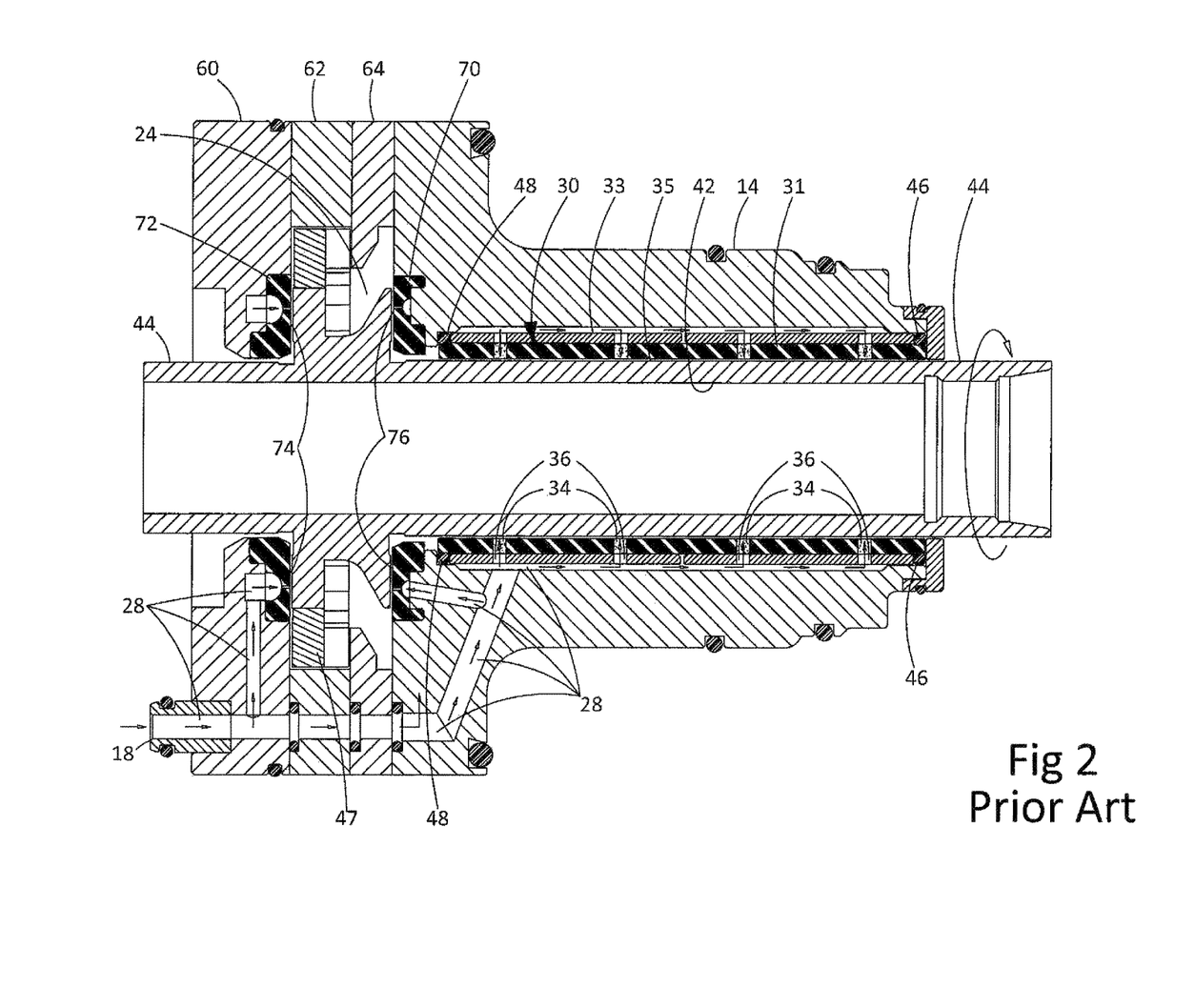
FIG. 2 is a side elevation in cross-section, of one embodiment of rotary bell cup atomizing apparatus and air bearing assembly known in the prior art.

FIG. 2 is a cross-sectional depiction of a prior art atomizing apparatus which includes an air bearing assembly in which "O"-rings are installed proximate the fore and aft ends of the main bearing assembly 30 which dampen radial vibration of the apparatus in operation. In the accompanying figures, common components are designated by common numbers for convenience and clarity. The apparatus shown in FIG. 2 is essentially that disclosed and claimed in commonly assigned U.S. Pat. No. 8,973,848 B2. In FIG. 2, the main air bearing assembly 30 is shown housed within bearing housing 14 and includes composite segmented cylindrical nonporous carbon segments 31 and porous carbon segments 34 (shown stipled) over-wrapped circumferentially by sleeve 33. Bearing assembly 30 has "O"-rings 46 and 48 installed around the assembly, one at the distal end and one at the proximal end, respectively, supporting, in operation, the rotating motor shaft 44. The composite cylindrical carbon air bearing assembly 30, having alternating nonporous carbon segments 31 and porous carbon segments 34 bonded together and overwrapped by sleeve 33, may be constructed such that sleeve 33, as shown in the figure, has separate half-sleeves, which is a preferred embodiment facilitating precise alignment of components having the required close tolerances.

Sleeve 33 has circumferential openings 36 therethrough and therearound as shown, which openings are positioned such that, on installation, and overwrapping the adjacent composite bearing assembly 30, openings 36 are aligned over each of their respective porous adjacent carbon segments 34 of the bearing assembly 30.

Drive air entering the apparatus is guided internally through channel 24, to drive turbine 47, and bearing air is channeled to and through air passageways 28, within bearing housing 14, all as depicted in FIG. 2. Air passageways 28 lead to and extend around the bearing assembly such that, as shown, each air-permeable porous segment 34 is aligned longitudinally with each row of circumferential openings 36 in sleeve 33, thereby placing the porous respective carbon segments 34, the sleeve openings 36, and the air passageways 28 all in longitudinal and circumferential registry.

For completeness of the detail shown in FIG. 2, the "O"-rings 46, 48 are installed in seats at the distal and proximal ends of the bearing assembly 30, respectively.

Bearing air entering the apparatus through inlet 18 is channeled as shown to and through main bearing assembly 30 and proximal and distal axial bearings 70 and 72, into the narrow gaps 35, 74 and 76 which support the rotating turbine 47 and motor shaft 44 in operation.

Figure 3:
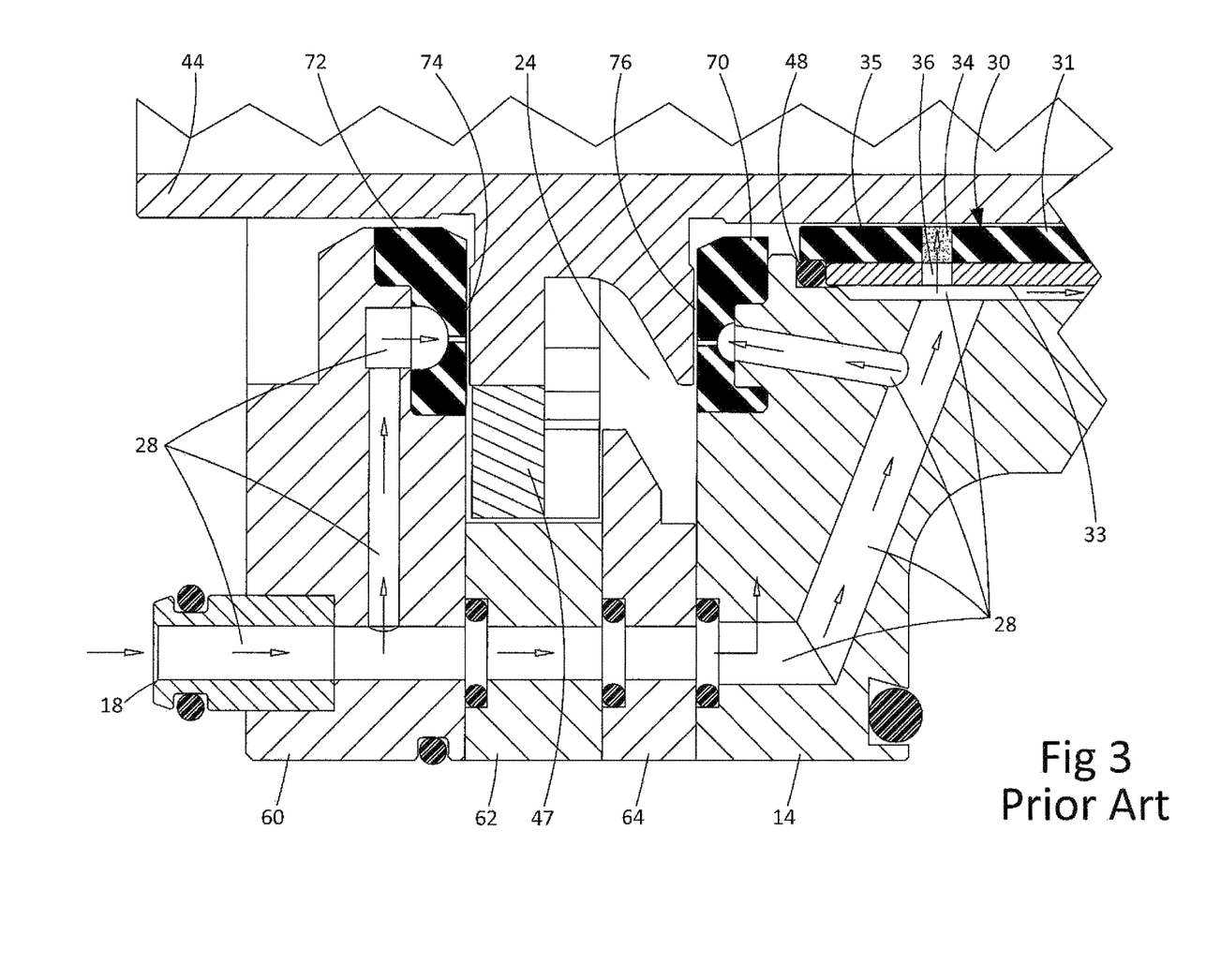
FIG. 3 is a cross-sectional exploded view of a portion of the prior art bell cup atomizing apparatus and air bearing assembly depicted in FIG. 2.

FIG. 3 is an exploded view of a portion of the prior art bearing assembly shown in FIG. 2, and common elements all bear the common numerical designations. In FIG. 3, bearing air entering the assembly passes through the air channels 28 to the narrow gap 35 between the rotating motor shaft 44 and the main bearing assembly 30 and into the gaps 74 and 76 between the rotating components and the axial thrust bearings 70 and 72. Radial vibration damping is provided during rotation by the proximal and distal "O"-rings 46, 48, respectively. The known prior art does not disclose rotary bell cup atomizers having air bearings in which air supplied to the apparatus is channeled into air gaps enveloping all rotating surfaces of all rotating components and in which 3-dimensional axial and radial vibration damping is achieved.

FIG. 4 depicts one embodiment of the invention in a cross-sectional view of the rotary bell cup atomizer 10 and its components. Therein, external housing 12 shown in FIG. 1 has been omitted for clarity, and turbine and bearing housing 14 is shown to include main bearing assembly 30, including cylindrical nonporous carbon main bearing segments 31 bonded with air permeable porous carbon segments 34 through which main bearing assembly 30 the rotatable motor shaft 44 extends, and through which porous segments 34 air from the bearing air supply 18 passes radially into gap 35. In an alternative variation, the air permeable porous carbon segments 34 are not included and, alternatively, air passages to gap 35 may be formed as through-openings (also denoted "34") through a nonporous cylindrical carbon main bearing component 31, both constructions being included in the scope of the invention.

In operation, in the illustration of FIG. 4, bearing air passes from supply 18 through passageways 28 and air permeable segments 34 and ultimately into the air gap 35 between the main bearing assembly 30 and the motor shaft 44. The circumferential cylindrical main bearing assembly 30 is shown in FIG. 4 to be over-wrapped by sleeve 33 having air passageways 36 therethrough, which are in registry with the porous carbon air passageways 34, and is included in the preferred complete main bearing depicted.

Main air bearing assembly 30 is described above in detail for illustrative purposes, but other constructions, known in the art and supportable within the bearing assembly of the invention, are also within the scope of the present invention. For example, the main bearing components may be of nonporous carbon, of porous carbon, and of a composite of segments of porous and nonporous carbon as presented above and disclosed in U.S. Pat. No. 8,973,848 B2, and of other suitable materials known in the art.

Air gap 35 is shown in more detail in a magnified view to be described below.

The optional reinforcing sleeve 33 over the main bearing assembly 30 may be of stainless steel, other metals including aluminum, and other suitable ferrous and nonferrous metals. As indicated, the sleeve 33 has openings 36 therethrough and therearound, all in registry with the passageways 34 through bearing component 31.

The main cylindrical air bearing assembly 30 has "O-"-rings 48 and 46 installed proximate each end, one, 48, at the proximal end and one, 46, at the distal end thereof as shown.

FIG. 4 also depicts proximal thrust bearing 56 and distal thrust bearing 54 which are mirror images of one another. These bearings may be of the same suitable materials as those for the main bearing described above, with porous and nonporous carbon being preferred materials, and may also include composites of carbon and a metal such as aluminum. These annular disk shaped bearings 54 and 56 have air passageways 28 formed therein which channel air as shown from the bearing air supply 18 to and through the bearings 54 and 56, thence into and through air channels 29 and into the air gaps 84 and 86, which, in operation, separate the bearings 54 and 56 from the rotating turbine/motor shaft, all as shown.

Proximate the outer periphery of the proximal annular disk shaped thrust bearing 56, a proximal, axial vibration damping "O"-ring 50 is positioned as shown adjacent the proximal face of the bearing 56. And proximate the outer periphery of the distal annular thrust bearing 54, a distal, axial vibration damping "O"-ring 52 is positioned as shown adjacent the distal face of the bearing 54.

In operation of the atomizing apparatus, these "O"-rings 50 and 52 effectively dampen axial vibrations of the turbine 47 and motor shaft 44.

The vibration damping "O"-rings 46, 48, 50 and 52 described above are preferably elastomeric, most preferably being of a perfluoroelastomer.

Included in FIG. 4 for completeness are rear housing or base plate 60, drive plate 62, spacer plate 64, and unnumbered self-evident sealing "O"-rings.

FIG. 5 shows a magnified view of a portion of the bearing assembly of the atomizing apparatus described in FIG. 4. In FIG. 5, air entering bearing air supply line 18 is channeled into and through all air passageways 28 and 29, porous segments 34 and openings 36 to and through all three bearings, that is, to and through the main bearing assembly 30, the proximal thrust bearing 56, and the distal thrust bearing 54, as shown. The thrust bearing air is channeled through passageways 29 into the gaps 84 and 86, respectively, and through sleeve and main bearing air passageways 34, 36 into the axial longitudinal gap 35 which extends between the main bearing assembly 30 and motor shaft 44 such that, in operation, the rotating turbine/ motor shaft assembly 44, 47 is essentially enveloped within a cushion of air in which the rotating assembly floats. The proximal "O"-ring 50 and the distal "O"-ring 52 dampen axial vibrations in operation, and the proximal and distal "O"-rings 48,46, positioned, respectively, circumferentially around the fore and aft ends of the main bearing assembly 30, dampen radial vibrations in operation. The result is, when bearing air is supplied to the apparatus, air is channeled into the air gaps enveloping all rotating surfaces of all rotating components, thereby providing universal, 3-dimensional vibration damping, both radial and axial, of all rotating components.

Functional, joint-sealing "O"-rings, unnumbered, are shown in FIG. 5, for completeness, as are rear housing 60, drive plate 62, and spacer plate 64, described below.

Figure 6A:
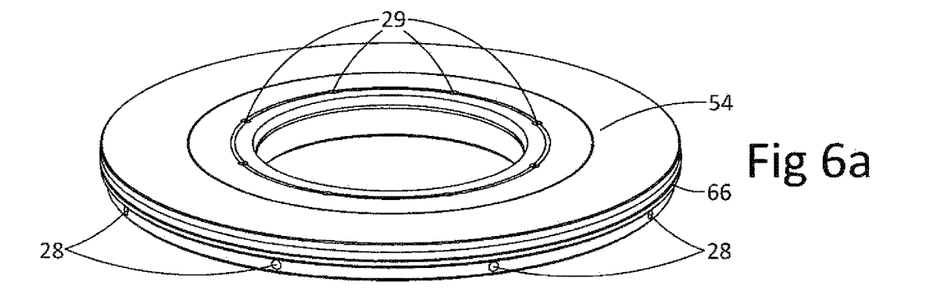
FIGS. 6a, 6b and 6c are diagrams of one annular, disk-shaped thrust bearing according to the invention, wherein specific air passageways into and through the bearing are depicted in phantom, with FIGS. 6a and 6b being schematic perspective views and 6c being a top plan view of the thrust bearing.
Figure 6B:
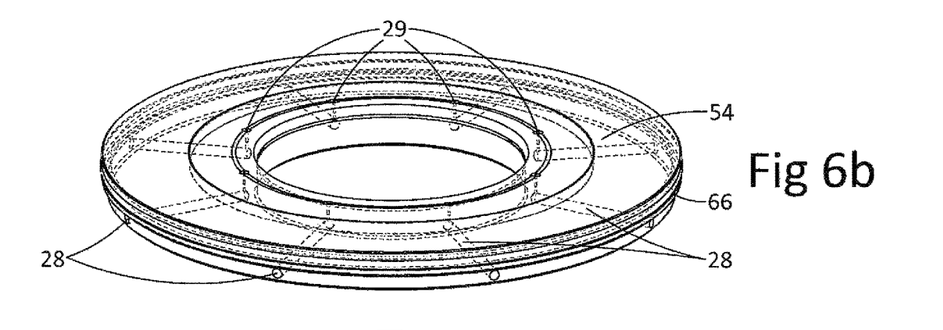
Figure 6C:
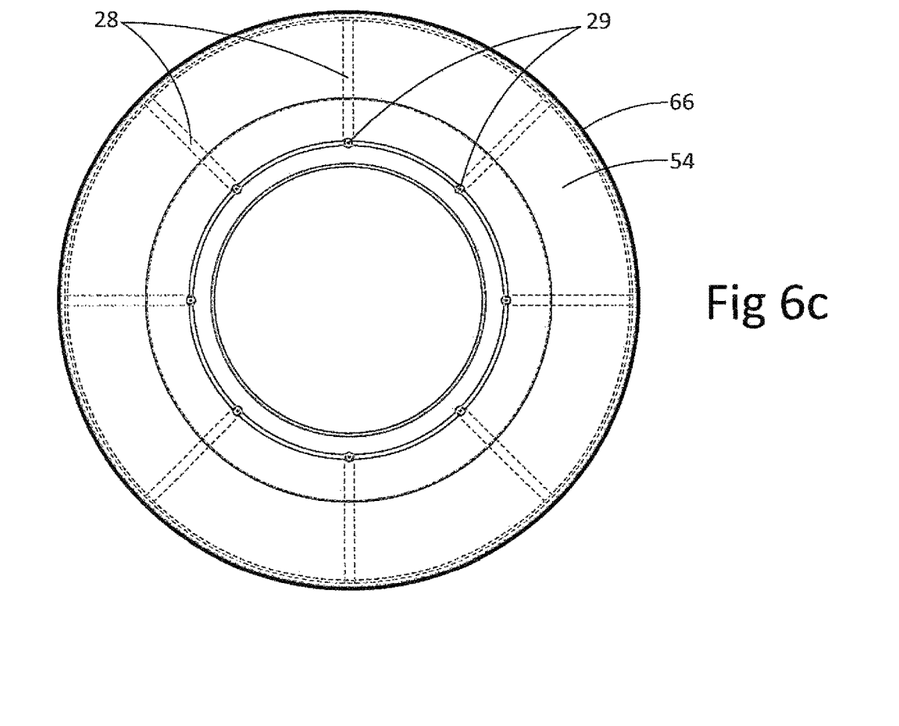

FIGS. 6a, 6b and 6c depict, respectively, the distal thrust bearing 54 in perspective views, showing internal air passageways 28, 29 outlined in phantom, and in a top plan view, also showing air passageways 28, 29 into and through bearing 54 in phantom.

Proximal thrust bearing 56 is not similarly shown, being essentially a mirror-image of bearing 54.

In all of FIGS. 6a, 6b and 6c, air channeled to and through air passageways 28 and 29 of thrust bearings 54 and 56 emerges from the air channels 29 into the air gaps detailed above in which the bearings float in air in operation. A sealing "O"-ring 66 is installed around the bearing 54 to seal against leakage.

Figure 7:
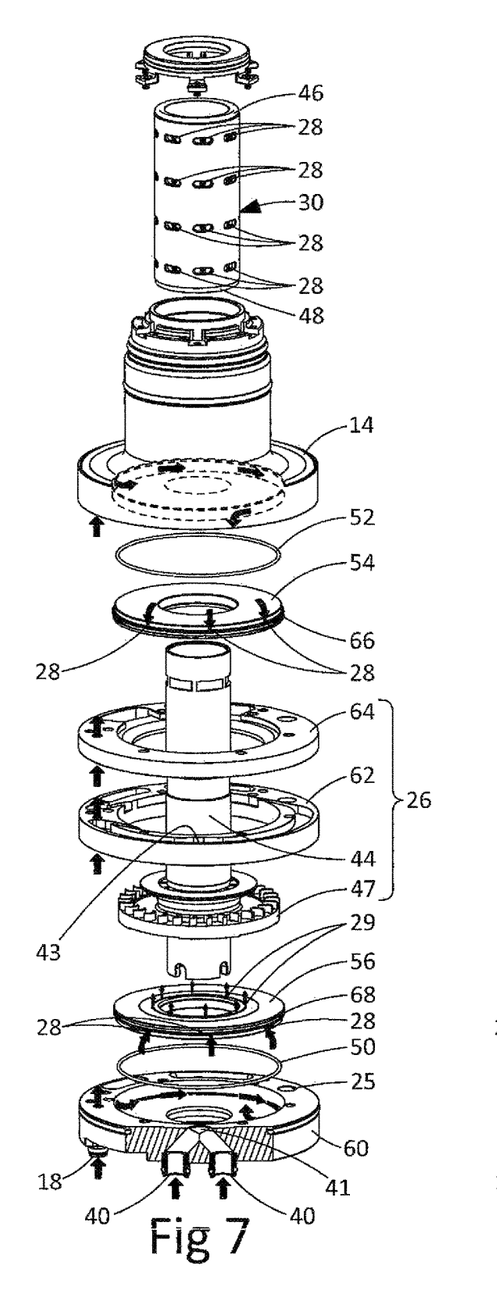
FIG. 7 is an exploded perspective view of elements of the invention, partially in cross-section.

FIG. 7 is an exploded view depicting preferred components of the apparatus according to the invention, wherein like components bear the same numbering as designated above, and redundant component detailed descriptions will not be repeated here. Suffice it to mention here, the relative positioning of the three bearings essential to the atomizing apparatus of the invention is readily apparent, including the proximal axial vibration damping "O"-ring 50, the proximal annular disk-shaped thrust bearing 56, the turbine and motor shaft 44, 47, where the bracketed turbine assembly 26 includes drive plate 62 and spacer plate 64, and turbine 47 and motor shaft 44, above which are distal annular disk-shaped thrust bearing 54, the distal axial vibration damping "O"-ring 52, the bearing housing 14 which houses the cylindrical main air bearing assembly 30, this main bearing assembly having installed therearound, as shown, the fore and aft radial vibration damping "O"-rings, 48, 46 respectively, all as described above.

Also shown in FIG. 7 is one preferred embodiment for introducing drive air to drive the turbine and motor shaft, wherein drive air is supplied to two drive air inlet ports 40 as shown, from the air supply, the two inlet ports leading into two air channels within base plate 60 as shown, the two channels converging within the base plate 60 from which the air exits plate 60 from the single outlet 41, the outlet 41 mating at the connection of base plate 60 and the inlet 43 into intermediate drive plate 62 which houses the turbine 47, the intermediate plate 62 having a channel therein and therearound as shown extending from the single drive air inlet 43 partially and substantially in a direction circumferentially around the intermediate plate 62, and through which intermediate plate channel the drive air is directed bi-directionally to the turbine blades.

Figure 7A:
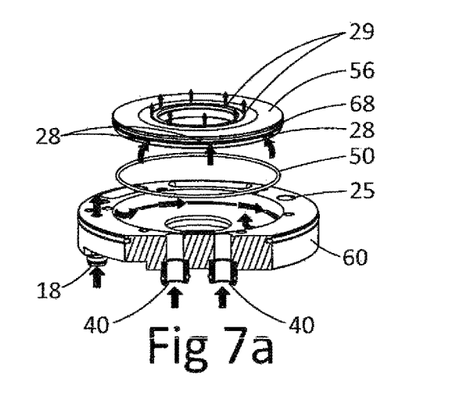
FIG. 7a depicts an embodiment, in perspective and partially in cross-section, of an alternate embodiment to that of FIG. 7 depicting air supply channels for driving the turbine according to the invention, showing only the base plate, proximal vibration-damping "O"-ring, and proximal, annular disk-shaped thrust bearing elements of the invention.

A second preferred embodiment for introducing drive air into the atomizing apparatus includes the configuration shown in FIG. 7a in which at least two parallel drive air inlet ports 40 into the apparatus supply air to drive turbine 47.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Rotary bell cup atomizing apparatus driven by a turbine mounted on a rotatable motor shaft supported within an air bearing assembly contained within a housing, and including an external air supply for supplying air to drive the turbine and channeling air to the air bearing assembly, the air bearing assembly comprising a cylindrical main air bearing supporting said motor shaft through which main bearing said motor shaft extends, a proximal, annular, disk-shaped thrust bearing supporting said turbine axially disposed proximally with respect to said turbine through which thrust bearing said motor shaft extends, a distal, annular, disk-shaped thrust bearing supporting said turbine axially disposed distally with respect to said turbine through which thrust bearing said motor shaft extends, said apparatus including air gaps formed between all said bearings and all in-operation rotating surfaces of said atomizing apparatus, and including a vibration-damping "O"-ring positioned proximally adjacent said proximal thrust bearing through which said motor shaft extends, a vibration-damping "O"-ring positioned distally adjacent said distal thrust bearing through which said motor shaft extends, and including "O"-rings installed circumferentially around said cylindrical main air bearing, one at the proximal end and one at the distal end of said main bearing, and having air passageways extending through all said bearings for supplying air from said external air supply through all bearings into all said air gaps between all bearings and all in-operation rotating surfaces of said atomizing apparatus, whereby, in operation, air supplied to said apparatus is delivered through said air passageways and into all said air gaps, thereby driving said rotatable turbine and motor shaft, wherein all rotating surfaces of said atomizing apparatus are, supported in air and said "O"-rings provide both axial and radial vibration damping of all rotating components.

2. The apparatus of claim 1 wherein said "O"-rings are composed of an elastomer.

3. The apparatus of claim 1 wherein said "O"-rings are composed of a perfluoroelastomer.

4. The apparatus of claim 1 wherein said main bearing is constructed of nonporous carbon.

5. The apparatus of claim 1 wherein said main bearing is constructed of porous carbon.

6. The apparatus of claim 1 wherein said main bearing is constructed of a composite of nonporous and porous carbon.

7. The apparatus of claim 1 wherein said main bearing is a composite bearing having alternating, segmented porous carbon sections and nonporous carbon sections bonded together.

8. The apparatus of claim 1 wherein said thrust bearings are constructed of nonporous carbon.

9. The apparatus of claim 1 wherein said thrust bearings are constructed of porous carbon.

10. The apparatus of claim 1 wherein said thrust bearings are constructed a composite of porous and nonporous carbon.

11. The apparatus of claim 1 wherein said thrust bearings are constructed of aluminum.

12. The apparatus of claim 7 having at least one sleeve installed externally and circumferentially about said main bearing, said at least one sleeve having openings formed therein, therethrough and therearound such that said openings are adjacent said porous carbon sections and are oriented so as to be in longitudinal and circumferential registry with said adjacent porous carbon sections.

13. The apparatus of claim 12 wherein said "O"-rings installed circumferentially around said cylindrical main air bearing are installed externally and circumferentially about said at least one sleeve, one at the proximal end and one at the distal end thereof.

14. The apparatus of claim 12 wherein said at least one sleeve is constructed of metal.

15. The apparatus of claim 14 wherein said at least one sleeve is constructed of stainless steel.

16. The apparatus of claim 14 wherein said at least one sleeve is constructed of ferrous metal.

17. The apparatus of claim 14 wherein said at least one sleeve is constructed of non-ferrous metal.

18. The apparatus of claim 1, including a base plate having at least two inlet ports leading into said apparatus for supplying said air to drive said turbine, wherein said at least two inlet ports are connected, respectively, to two air channels leading through said base plate, said two air channels converging within said base plate and opening into a single drive air outlet from said base plate, said single base plate drive air outlet mating at a base of said turbine with a single drive air inlet into a flow distribution intermediate plate, which intermediate plate houses blades of said turbine, said intermediate plate having a channel therein and therearound extending from said single drive air inlet partially and substantially in a direction circumferentially around said intermediate plate, and through which intermediate plate channel said drive air is directed hi-directionally to said turbine blades.

19. The apparatus of claim 1 including a base plate and having at least two drive air inlet ports connected, respectively, to two parallel drive air inlet channels leading into a flow distribution intermediate plate, through which intermediate plate drive air is directed to blades of said turbine.

20. The apparatus of claim 1 wherein said "O"-rings are composed of a perfluoroelastomer, said main bearing is constructed of a composite of alternating segmented nonporous and porous carbon sections bonded together, said thrust bearings are constructed of carbon, and said main bearing has at least one sleeve installed externally and circumferentially therearound, said at least one sleeve having openings formed therein, therethrough and therearound such that said openings are adjacent said porous carbon sections and are oriented so as to be in longitudinal and circumferential registry with said adjacent porous carbon sections, wherein said "O"-rings installed circumferentially around said cylindrical main air bearing are installed externally and circumferentially about said at least one sleeve, one at the proximal end and one at the distal end thereof, and wherein said at least one sleeve is constructed of stainless steel.

* * * * *

UNITED STATES PATENT AND TRADEMARK OFFICE
CERTIFICATE OF CORRECTION

Page 1 of 1

PATENT NO. : 9,970,481 B1
APPLICATION NO. : 15/719797
DATED : May 15, 2018
INVENTOR(S) : Gunnar van der Steur and Joseph Cichocki It is certified that error appears in the above-identified patent and that said Letters Patent is hereby corrected as shown below:

In the Claims

Claim 10, Column 9, Line 54: Between "constructed" and "a" insert --of--.

Signed and Sealed this
Fourteenth Day of August, 2018

Andrei Iancu
*Director of the United States Patent and Trademark Office*